No. 681,543. Patented Aug. 27, 1901.
W. B. GRIFFIN.
SPRING GEAR FOR VEHICLES.
(Application filed Feb. 28, 1901.)

(No Model.)

Witnesses

Inventor
William B. Griffin,
By H. B. Willson & Co.
Attorneys

THE NORRIS PETERS CO., PHOTO-LITHO., WASHINGTON, D. C.

UNITED STATES PATENT OFFICE.

WILLIAM B. GRIFFIN, OF GLENS FALLS, NEW YORK.

SPRING-GEAR FOR VEHICLES.

SPECIFICATION forming part of Letters Patent No. 681,543, dated August 27, 1901.

Application filed February 28, 1901. Serial No. 49,303. (No model.)

*To all whom it may concern:*

Be it known that I, WILLIAM B. GRIFFIN, a citizen of the United States, residing at Glens Falls, in the county of Warren and State of New York, have invented certain new and useful Improvements in Vehicles; and I do declare the following to be a full, clear, and exact description of the invention, such as will enable others skilled in the art to which it appertains to make and use the same.

The invention relates to vehicles of the "buckboard-gear" type.

Heretofore it has been the common practice to attach the spring-boards direct to the rear axle by bolts or other equivalent fastening means. This has been found to be objectionable, as the noises are transmitted from the axles to the boards, which act as sounding-boards and greatly increase the noise and render buckboard-gears objectionable for this reason. To overcome this objection, strips or blocks of leather or rubber have been interposed between the ends of the boards and the axle; but these strips or blocks soon become hardened by constant use and in the course of time form practically as good a conductor of sound as the boards themselves.

It is the object of the present invention to connect the rear ends of the boards to the rear axle in such manner as to reduce to a minimum the transmission of sound through the boards; and to that end my invention primarily consists in the provision of a stock or head block whose ends are separated from the axle by an intervening space, so that all noises produced by the running-gear will be reduced to a minimum.

Figure 1:
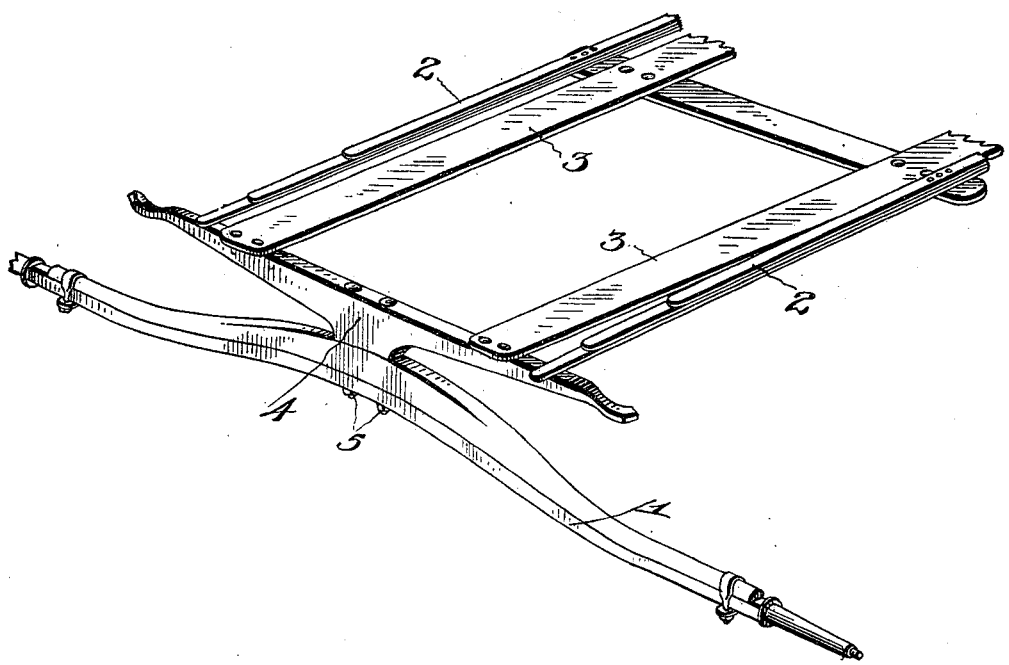
Figure 2:
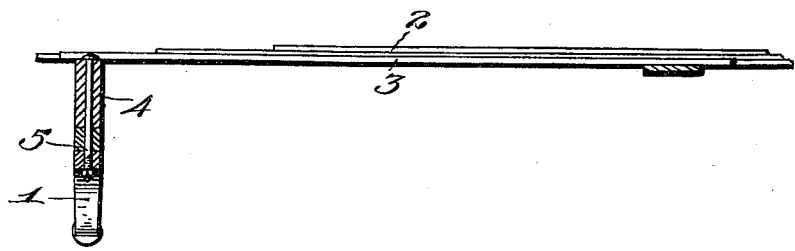

In the accompanying drawings, Figure 1 is a perspective view of the rear axle, the metal side springs, and the spring-boards, illustrating my invention. Fig. 2 is a vertical longitudinal sectional view.

Referring to the drawings, 1 denotes the rear axle of a vehicle, 2 the metal springs, and 3 the spring-boards. These elements may be of any well-known or approved construction and in themselves form no part of the present invention.

4 denotes a stock or head block bolted or otherwise secured at a point intermediate its ends, as indicated at 5, to the axle 1 and having its laterally-projecting ends spaced from and free from contact with the axle. To these spaced-apart ends are bolted or otherwise secured the boards 3 and the springs 2, and by this construction and arrangement of parts it will be apparent that the transmission of sound from the axle to and through said parts, as well as from the metal springs, will be reduced to a minimum.

From the foregoing description, taken in connection with the accompanying drawings, the construction and mode of operation of my invention will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

The combination with the rear axle of a vehicle, of a stock or head block secured at a point intermediate its ends to said axle and having its ends located in a plane above the axle and free from contact with the axle, and spring-boards and metal side springs secured to said ends, substantially as set forth.

In testimony whereof I have hereunto set my hand in presence of two subscribing witnesses.

WILLIAM B. GRIFFIN.

Witnesses:
MICHAEL L. BOYLE,
FRED H. THOMPSON.